United States Patent [19]
Koyama et al.

[11] Patent Number: 5,930,443
[45] Date of Patent: Jul. 27, 1999

[54] VIDEO SIGNAL PROCESSING APPARATUS

[75] Inventors: Shinichi Koyama, Tokyo; Teruo Hieda, Kanagawa-ken; Shinichi Hatae, Kanagawa-ken; Jun Makino, Kanagawa-ken; Kousuke Nobuoka, Kanagawa-ken, all of Japan

[73] Assignee: Canon Kabushiki Kaisha, Tokyo, Japan

[21] Appl. No.: 08/287,719

[22] Filed: Aug. 9, 1994

Related U.S. Application Data

[63] Continuation of application No. 07/977,822, Nov. 17, 1992, abandoned.

[30]  Foreign Application Priority Data

Nov. 22, 1991 [JP] Japan .................................... 3-307796

[51] Int. Cl.⁶ .............................. H04N 9/79; H04N 9/07
[52] U.S. Cl. .............................. 386/38; 386/35; 348/207
[58] Field of Search .................................. 358/310, 328, 358/329, 327, 330, 906, 909.1, 335, 314; 360/33.1, 36.1; 386/1, 26, 34, 40, 45; 348/207, 241, 242, 252; H04N 5/225, 9/79, 9/64, 5/14, 5/208, 9/07

[56] References Cited

U.S. PATENT DOCUMENTS

| | | | |
|---|---|---|---|
| 4,613,909 | 9/1986 | Tobe | 358/310 |
| 4,823,190 | 4/1989 | Yamamoto | 358/37 |
| 4,876,599 | 10/1989 | Kihara | 358/37 |
| 5,027,222 | 6/1991 | Shinbo et al. | 358/342 |
| 5,050,002 | 9/1991 | Suzuki et al. | 358/314 |
| 5,057,934 | 10/1991 | Yun et al. | 358/314 |
| 5,065,259 | 11/1991 | Kubota et al. | 358/335 |
| 5,142,375 | 8/1992 | Fukuda et al. | 358/906 |
| 5,200,834 | 4/1993 | Iwaibana et al. | 386/34 |

*Primary Examiner*—Thai Tran
*Attorney, Agent, or Firm*—Robin, Blecker & Daley

[57] ABSTRACT

A video signal processing apparatus comprises an image pickup part arranged to photo-electrically convert an optically formed image and to output it as an electrical signal, an external input part which permits external input of a video signal, and a signal processing part which has a delay circuit. The signal processing part forms a color video signal from the electrical signal outputted from the image pickup part and separates the video signal inputted from the external input part into luminance and chrominance signals by using the delay circuit.

7 Claims, 12 Drawing Sheets

VIDEO SIGNAL PROCESSING APPARATUS

This is a continuation application under 37 CFR 1.62 of prior application Ser. No. 07/977,822 filed Nov. 17, 1992 (now abandoned).

BACKGROUND OF THE INVENTION

1. Field of the Invention

This invention relates to a video signal processing apparatus arranged to digitally perform a signal processing action on a video signal.

2. Description of the Related Art

Video cameras have rapidly become popular as a result of a reduction in size and an increase in recording density and are examples of video signal processing apparatuses:

As a result of the progress of semiconductor technology, it has recently been proposed to replace an analog signal processing action conventionally carried out within a video camera with a digital signal processing action by using an analog-to-digital (hereinafter referred to as A/D) converter and a digital-to-analog (hereinafter referred to as D/A) converter which operate at high speeds for processing a video signal within the video camera.

The video camera of the kind performing digital signal processing is described below with reference to FIG. 1, which is a block diagram showing the video camera:

A shooting or image pickup action is first described. An object image formed by a lens which is not shown is photo-electrically converted by a CCD (image sensor) 51. After that, the electrical signal thus obtained is supplied through a correlated double sampling (hereinafter referred to as CDS) circuit 52 and an automatic gain control (hereinafter referred to as AGC) circuit 53 to an A/D converter 54. The A/D converter 54 converts this signal from an analog signal into a digital signal.

The digital signal is sent to one-horizontal period delay (hereinafter referred to as 1HDL) circuits 55 and 56. Delayed signals which are thus obtained by the 1HDL circuits 55 and 56 are respectively inputted to a camera luminance (Y-) processing circuit 57 and a camera chrominance (C-) processing circuit 58. The camera Y-processing circuit 57 forms a luminance signal (hereinafter referred to as Y signal) from the digital-converted image pickup signal. The Y signal is supplied to an adder 59 to have a synchronizing (hereinafter referred to as sync) signal added thereto and is then inputted from the adder 59 to a recording/reproducing Y-processing circuit 68.

The recording/reproducing Y-processing circuit 68 performs processes such as an emphasis process, etc., necessary for magnetic recording. The digital signal which is thus processed is supplied to a D/A converter 69 to be converted into an analog signal. The analog signal is supplied to a modulator-demodulator 70 to be frequency-modulated there.

Meanwhile, the camera C-processing circuit 58 forms two color-difference signals including R-Y and B-Y signals from the digital-converted image pickup signal. The two color-difference signals are modulated into a chrominance signal (hereinafter referred to as C signal). The C signal is sent to a recording/reproducing C-processing circuit 71. At the recording/reproducing C-processing circuit 71, the frequency of the C signal is down-converted. The down-converted C signal is then supplied to a D/A converter 72 to be converted into an analog C signal.

The luminance signal (Y signal) which has been frequency-modulated and the chrominance signal (C signal) which has been frequency-down-converted are combined with each other at an adder 73 and then recorded on a video tape 86 through a recording amplifier 74, a change-over switch 75 and a recording/reproducing head 76.

In a case where an external input video signal is to be recorded and the video signal is inputted in a state of being separated into a luminance (Y) signal and a chrominance (C) signal, a recording action is performed as follows: the luminance signal included in the input signal from an external equipment which is not shown is converted into a digital signal by an A/D converter 60. The digital luminance signal thus obtained is inputted to the recording/reproducing Y-processing circuit 68 via a change-over switch 66. Signal processing actions to be carried out after the recording/reproducing Y-processing circuit 68 are similar to the processes performed in recording the image pickup signal as described above.

Meanwhile, the chrominance signal included in the external input video signal is converted by an A/D converter 62 also into a digital signal. This digital signal is inputted to the recording/reproducing C-processing circuit 71 via a change-over switch 67. The signal processing actions after the recording/reproducing C-processing circuit 71 are similar to the above-stated processes performed in recording the image pickup signal.

In recording an external input video signal, if the input video signal is a composite video signal, the recording action is performed as described below:

The input composite video signal from external equipment which is not shown is converted into a digital signal by an A/D converter 61. The digital signal thus obtained is inputted to a Y/C separation circuit which is composed of a 1HDL 63, an adder 64 and a subtracter 65 to be separated into Y (luminance) and C (chrominance) signals. After that, the Y signal is inputted to the recording/reproducing Y-processing circuit 68 via the change-over switch 66. Meanwhile, the C signal is inputted to the recording/reproducing C-processing circuit 71 via the change-over switch 67.

The processes to be carried out after the recording/reproducing Y-processing and C-processing circuits 68 and 71 are similar to the processes performed in processing the image pickup signal as described in the foregoing.

Next, signal processing to be performed at the time of reproduction is as described below:

The signal recorded on the video tape 86 is read out by the recording/reproducing head 76. The output of the recording/reproducing head 76 is amplified to a given level by a head amplifier 77 through the change-over switch 75. The reproduced signal which is thus amplified is inputted to a high-pass filter (hereinafter referred to as HPF) 78 and to a band-pass filter (hereinafter referred to as BPF) 80. A frequency-modulated luminance signal is separated from the reproduced signal by the HPF 78. The separated luminance signal is demodulated by a demodulator 70 and is then converted into a digital signal by an A/D converter 79. The digital Y signal thus obtained is inputted to the recording/reproducing Y-processing circuit 68 to be subjected to processes which are carried out reversely to the processes performed for recording.

A down-converted chrominance signal is separated from the reproduced signal by the BPF 80. The chrominance signal thus obtained is converted into a digital signal by an A/D converter 81. The digital chrominance signal is inputted to the recording/reproducing C-processing circuit 71 to be subjected to processes which are carried out reversely to the processes performed for recording.

The Y and C signals which are thus converted into their original signals are respectively converted into analog signals by D/A converters 82 and 83 in their separated states. The analog Y and C signals are then outputted either as they are, as line outputs, or in the form of a composite video signal after the Y and C signals are combined with each other by an adder 84.

Further, the luminance signal (Y signal) which has been converted by the D/A converter 82 into an analog signal is supplied also to an electronic viewfinder (hereinafter referred to as EVF) 85 for monitoring.

Further signal processing actions on the video signal are performed by various processing circuits for a higher picture quality and a higher resolution in addition to the basic signal processing actions described above.

For example, the recording/reproducing Y-processing circuit 68 and/or the recording/reproducing C-processing circuit 71 is arranged to include a 1HDL circuit. At the time of reproduction, the 1HDL circuit is used for a process of removing a crosstalk component, a process of emphasizing vertical edge parts (hereinafter referred to as vertical enhancing), a process of preventing any sudden deterioration in displayed image quality in the event of occurrence of a dropout in the recorded signal (hereinafter referred to as dropout compensation), etc.

However, in cases where signal processing by the conventional video camera is digitized, it has been necessary to provide an A/D converter at each of signal input parts and a D/A converter on the signal output side. Therefore, even if the details of signal processing are equivalent to those of analog signal processing, the number of component parts is increased by the parts added for the digital signal processing. Further, according to the conventional arrangement, the digital processing circuits are arranged discretely for image pickup system, a recording system and a reproduction system. The use of discrete digital processing circuits greatly increases the scale of circuit arrangement and thus has been disadvantageous in respect to a reduction in cost and size.

SUMMARY OF THE INVETNION

It is an object of this invention to provide a video signal processing apparatus which is arranged to be capable of solving the above-stated problems of the prior art without increasing the number of necessary component parts.

To attain this object, a video signal processing apparatus which is arranged according to this invention as a preferred embodiment thereof comprises image pickup means arranged to photo-electrically convert an optically formed image and to output the image as an electrical signal; external input means arranged to permit external input of a video signal; and signal processing means having a delay circuit, the signal processing means being arranged to form a color video signal from the electrical signal outputted from the image pickup means by using the delay circuit and also to separate the video signal inputted from the external input means into a luminance signal and a chrominance signal by using the delay circuit.

Further, a video signal processing apparatus which is arranged as another preferred embodiment of this invention to digitally process a video signal comprises image pickup means arranged to photo-electrically convert an optically formed image and to output the image as an electrical signal; external input means arranged to permit external input of a video signal; and digital conversion means for selectively converting into a digital signal the electrical signal outputted from the image pickup means or the video signal inputted from the external input means.

Other objects and advantages of the invention will become apparent from the following detailed description of embodiments thereof taken in conjunction with the accompanying drawings.

DETAILED DESCRIPTION OF THE PREFERRED EMBODIMENTS

Figure 1:
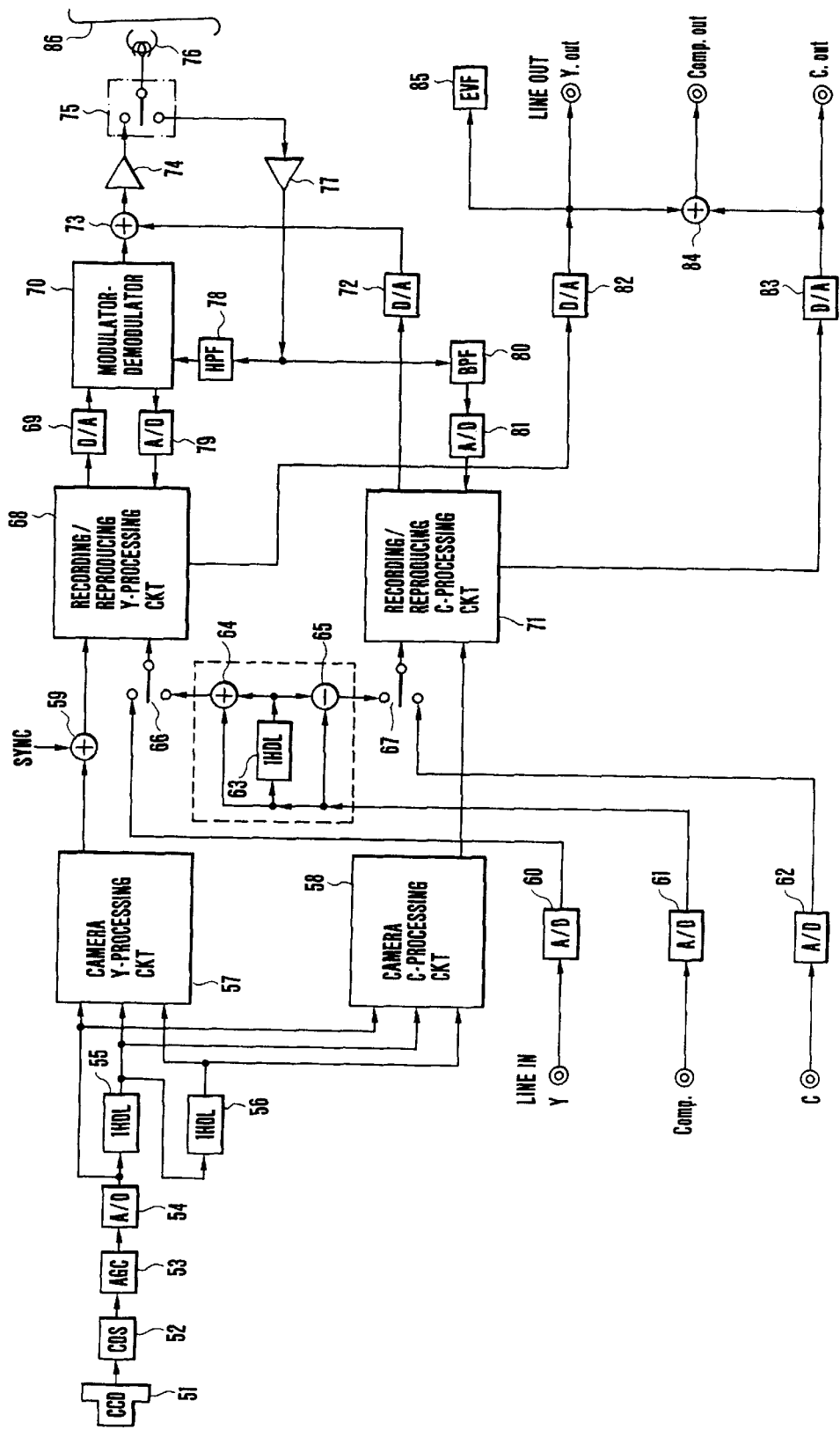
FIG. 1 is a block diagram showing the arrangement of the conventional video camera.
Figure 2:
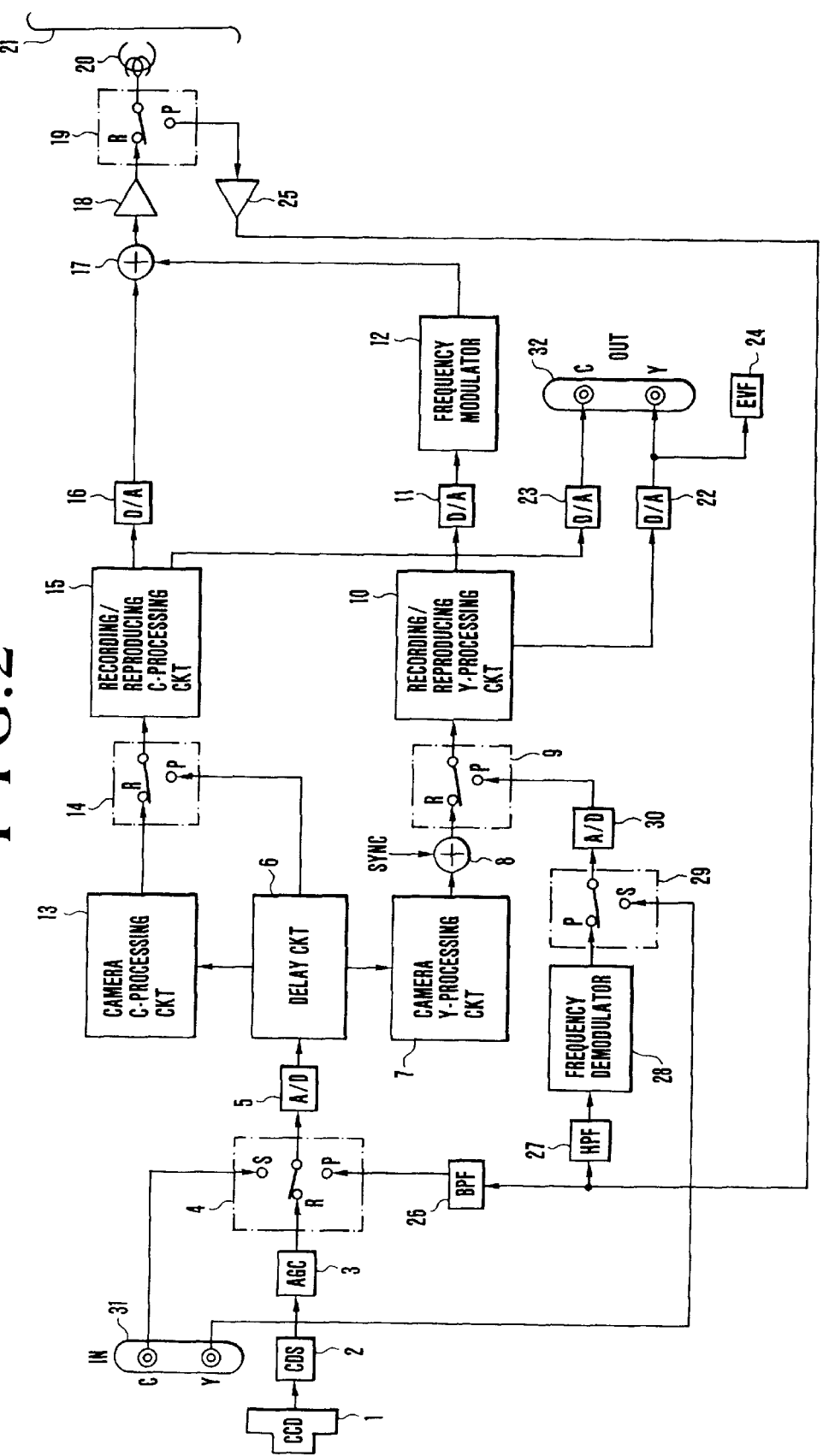
FIG. 2 is a block diagram showing a video camera arranged as a first embodiment of this invention.

A video camera which is arranged according to this invention as a first embodiment thereof is described in detail below with reference to FIGS. 2 and 3:

FIG. 2 is a block diagram showing the video camera arranged as the first embodiment of the invention. FIG. 3 is a block diagram showing a delay circuit 6 which is included in FIG. 2.

Referring to FIG. 2, a CCD 1 which is a color image sensor has color separating minute filters forming an image pickup plane. The illustration includes a CDS 2, an AGC 3, and change-over switches 4, 9, 14, 19 and 29 arranged to be controlled by a system control circuit which is not shown in accordance with instructions given by a mode selection switch or the like which is not shown. Each of A/D converters 5 and 30 is arranged to convert an analog input signal into a digital signal consisting of about eight or nine bits. A delay circuit 6 includes two one-horizontal delay (1HDL) circuits.

A camera luminance processing (Y-processing) circuit 7 is arranged to form a luminance signal from an image pickup signal which is obtained by photo-electric conversion performed by the CCD 1 and to perform various processes including a gamma correction, black and white clipping, blanking signal addition, etc. An adder 8 is arranged to add a sync signal SYNC to the output of the circuit 7. A recording/reproducing luminance processing (Y-processing) circuit 10 includes preemphasis, deemphasis and clipping circuits. Each of D/A converters 11, 16, 22 and 23 is arranged to convert a digital signal of about 8 to 10 bits into an analog signal. A frequency modulator 12 is arranged to frequency-modulate the luminance signal into a given narrow frequency band. A camera chrominance processing (C-processing) circuit 13 is arranged to form two color-difference signals (R-Y and B-Y signals) from the image pickup signal obtained through photo-electric conversion performed by the CCD 1 and to perform processes for gamma correction, orthogonal modulation and burst addition for forming a chrominance signal from the two color-difference signals. A recording/reproducing chrominance processing (C-processing) circuit 15 is arranged to perform processes for emphasis, deemphasis, color phase inversion and frequency conversion.

An adder 17 is arranged to add together a frequency-modulated luminance signal and a frequency-down-converted chrominance signal. The illustration further includes a video amplifier 18 for recording, a recording/reproducing head 20, a magnetic tape 21 which is used as a recording medium, an electronic viewfinder (EVF) 24 for monitoring a pickup picture or a reproduced picture, and a video amplifier 25 for reproduction.

A BPF (band-pass filter) 26 is arranged to separate a low-band signal (chrominance signal) from the input signal. An HPF (high-pass filter) 27 is arranged to separate a high-band signal (luminance signal) from the input signal. A frequency demodulator 28 is arranged to demodulate the frequency-modulated luminance signal.

A separation type video input terminal 31 (hereinafter referred to as S input terminal) is arranged to have a luminance signal and a chrominance signal inputted separately from each other. A separation type video output terminal 32 (hereinafter referred to as S output terminal) is arranged to output a luminance signal and a chrominance signal separately from each other.

Figure 3:
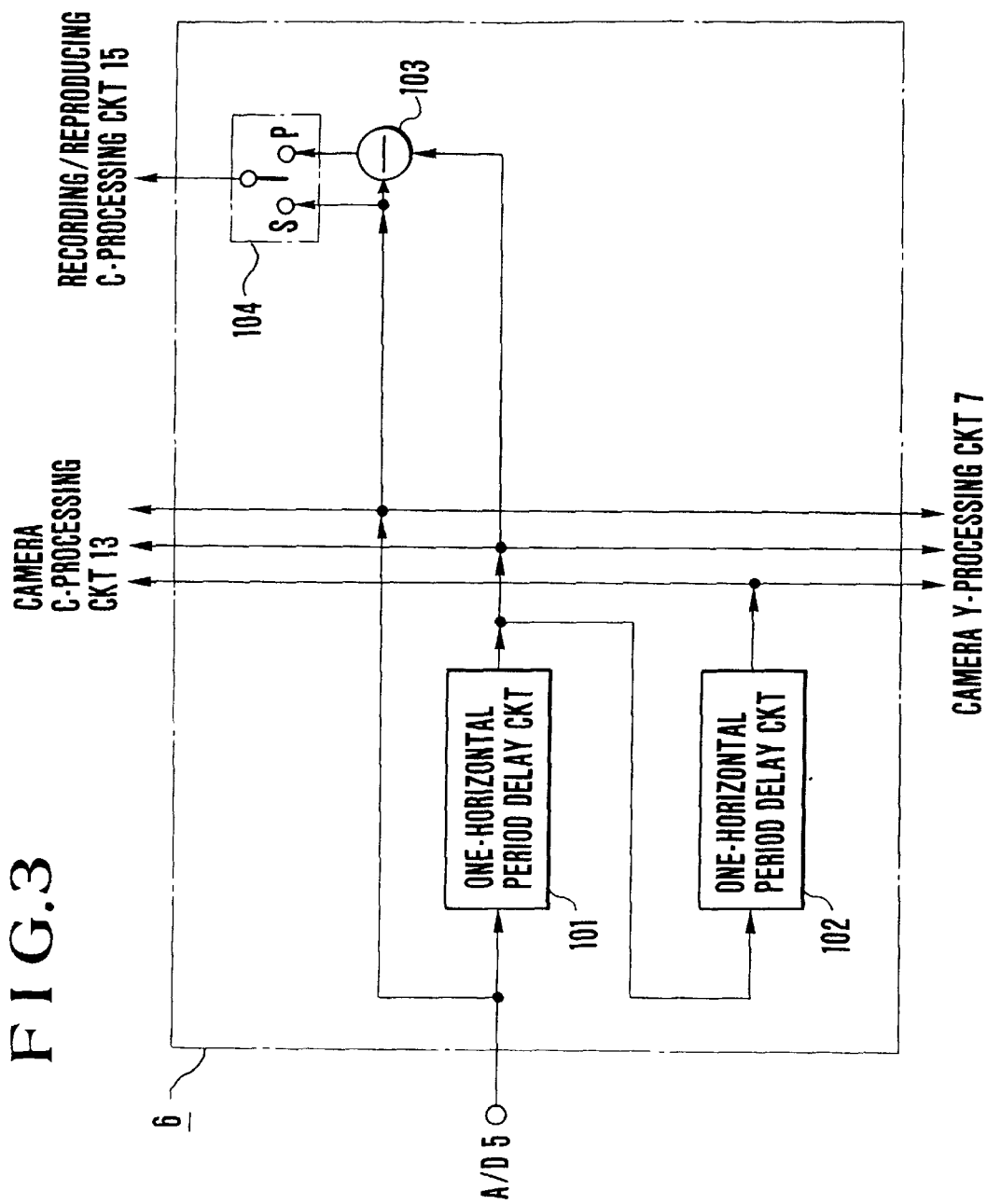
FIG. 3 is a block diagram showing the details of the essential parts of the video camera shown in FIG. 2.

In FIG. 3, reference numerals 101 and 102 denote 1HDL circuits. Reference numeral 103 denotes a subtracter. Reference numeral 104 denotes a change-over switch.

Further, the circuits and change-over switches forming the video camera are controlled by a system control circuit which is not shown.

With the video camera arranged as described above, the operation thereof to be performed at the time of image pickup and recording is described as follows:

A shooting object which is not shown is imaged on the image forming plane of the CCD 1 by a photo-taking optical system which is not shown. The object image is photo-electrically converted by the CCD 1 into an image signal. The signal is subjected to given processes through the CDS 2 and the AGC 3 and is then inputted to the A/D converter 5 via the change-over switch 4 with the switch 4 connected to one side R thereof. The signal is converted into a digital signal by the A/D converter 5. The digital signal is inputted to the delay circuit 6.

Referring to FIG. 3, the digital signal inputted to the delay circuit 6 is sent to the 1HDL circuits 101 and 102. Signals thus delayed by these 1HDL circuits are inputted respectively to the camera Y-processing circuit 7 and the camera C-processing circuit 13. At this time, the change-over switch 104 is in an open state.

The camera Y-processing circuit 7 forms a luminance signal from the input signal and performs a gamma correction process, a white and black clipping process and a blanking signal adding process. After these processes, a sync signal is added to the luminance signal by the adder 8. With the sync signal added thereto, the luminance signal is sent to the recording/reproducing Y-processing circuit 10 via the change-over switch 9 (connected to one side R). The circuit 10 then performs preemphasis and clipping processes required for recording.

The output of the recording/reproducing Y-processing circuit 10 is converted into an analog signal by the D/A converter 11. The analog signal is frequency-modulated by the frequency modulator 12. After that, a down-converted chrominance signal which will be described later and the frequency-modulated luminance signal are added together by the adder 17. The output of the adder 17 is recorded on the video tape 21 by the recording/reproducing head 20 via the change-over switch 19 (connected to one side R).

Meanwhile, the camera C-processing circuit 13 forms two color-difference signals (R-Y and B-Y signals) from the input signal. The circuit 13 then performs processes for gamma correction, a color-difference matrix, orthogonal modulation and burst addition necessary for forming a chrominance signal by modulating the two color-difference signals. After the signal processing, the output of the camera C-processing circuit 13 is inputted to the recording/reproducing C-processing circuit 15 via the change-over switch 14 (connected to one side R). At the recording/reproducing C-processing circuit 15, the frequency of the chrominance signal obtained through the above-stated processes is down-converted. After that, the circuit 15 performs preemphasis and color-phase inversion processes necessary for recording.

The output of the recording/reproducing C-processing circuit 15 is converted into an analog signal by the D/A converter 16. Then, as mentioned above, the analog signal thus obtained is added to the frequency-modulated luminance signal by the adder 17.

In a case where an external input image is to be recorded and the external input image is inputted in a state of having a luminance signal and a chrominance signal separated from each other, the recording action is performed in the following manner:

The input signal from an external equipment which is not shown is inputted to the S input terminal 31. The chrominance signal included in the input signal passes through one side S of the change-over switch 4 to be converted into a digital signal by the A/D converter 5. The digital signal is inputted to the delay circuit 6. In this instance, within the delay circuit 6 (see FIG. 3), the connecting position of the change-over switch 104 is on one side S thereof. With the switch 104 on the side S, the chrominance signal inputted to the delay circuit 6 is not processed and is allowed to be inputted via the change-over switch 14 (connected to one side P) to the recording/reproducing C-processing circuit 15.

Processes to be performed by the circuit 15 and by the parts arranged subsequent to the circuit 15 are similar to the processes performed in recording the image pickup signal as described in the foregoing.

The luminance signal included in the input signal from the external equipment is supplied via the change-over switch 29 (connected to one side S) to the A/D converter 30 to be converted into a digital signal. The digital signal is inputted via the change-over switch 9 (connected to one side P) to the recording/reproducing Y-processing circuit 10. Processes to be performed by the circuit 10 and the parts subsequent to the circuit 10 are similar to the processes performed in recording the image pickup signal as described in the foregoing.

The operation of the embodiment at the time of reproduction is performed as described below:

A signal recorded on the video tape 21 is read out by the recording/reproducing head 20. The output of the head 20 is supplied via the change-over switch 19 (connected on one side P) to the head amplifier 25 to be amplified up to a given level. The amplified signal is first supplied to the BPF 26 to have the down-converted chrominance signal separated. The output of the BPF 26 is supplied via the change-over switch 4 (connected to one side P) to the A/D converter 5 to be converted into a digital signal. The digital signal is inputted to the delay circuit 6. In this instance, within the delay circuit 6 (see FIG. 3), the connecting position of the change-over switch 104 is on one side P. With the switch 104 on the side P, the down-converted chrominance signal inputted to the delay circuit 6 is inputted to the 1HDL circuit 101 to be delayed by one horizontal period. A difference between the signal thus delayed and the signal which is not delayed is computed by the subtracter 103 in such a way as to remove a crosstalk component. The output of the subtracter 103 is inputted via the switch 104 and the change-over switch 14 (connected to one side P) to the recording/reproducing C-processing circuit 15.

At the recording/reproducing C-processing circuit 15, processes necessary for reproduction including deemphasis, color phase inversion and frequency conversion processes are carried out in a manner reverse to the processes performed at the time of recording. The output of the recording/reproducing C-processing circuit 15 is converted into an analog signal by the D/A converter 23. The analog signal is then outputted to the outside from the S output terminal 32.

The frequency-modulated luminance signal which is included in the output of the head amplifier 25 is separated by the HPF 27 and is demodulated by the frequency demodulator 28. The demodulated luminance signal is then supplied via the change-over switch 29 (connected to one side P) to the A/D converter 30 to be converted into a digital signal. The digital signal is inputted to the recording/reproducing Y-processing circuit 10 via the change-over switch 9 (connected to one side P).

The recording/reproducing Y-processing circuit 10 performs a deemphasis process which is necessary time of reproduction. The output of the Y-processing circuit 10 is converted into an analog signal by the D/A converter 22. The analog luminance signal is outputted to the outside from the S output terminal 32. Further, the analog luminance signal is outputted also to the EVF 24 for monitoring.

Figure 4:
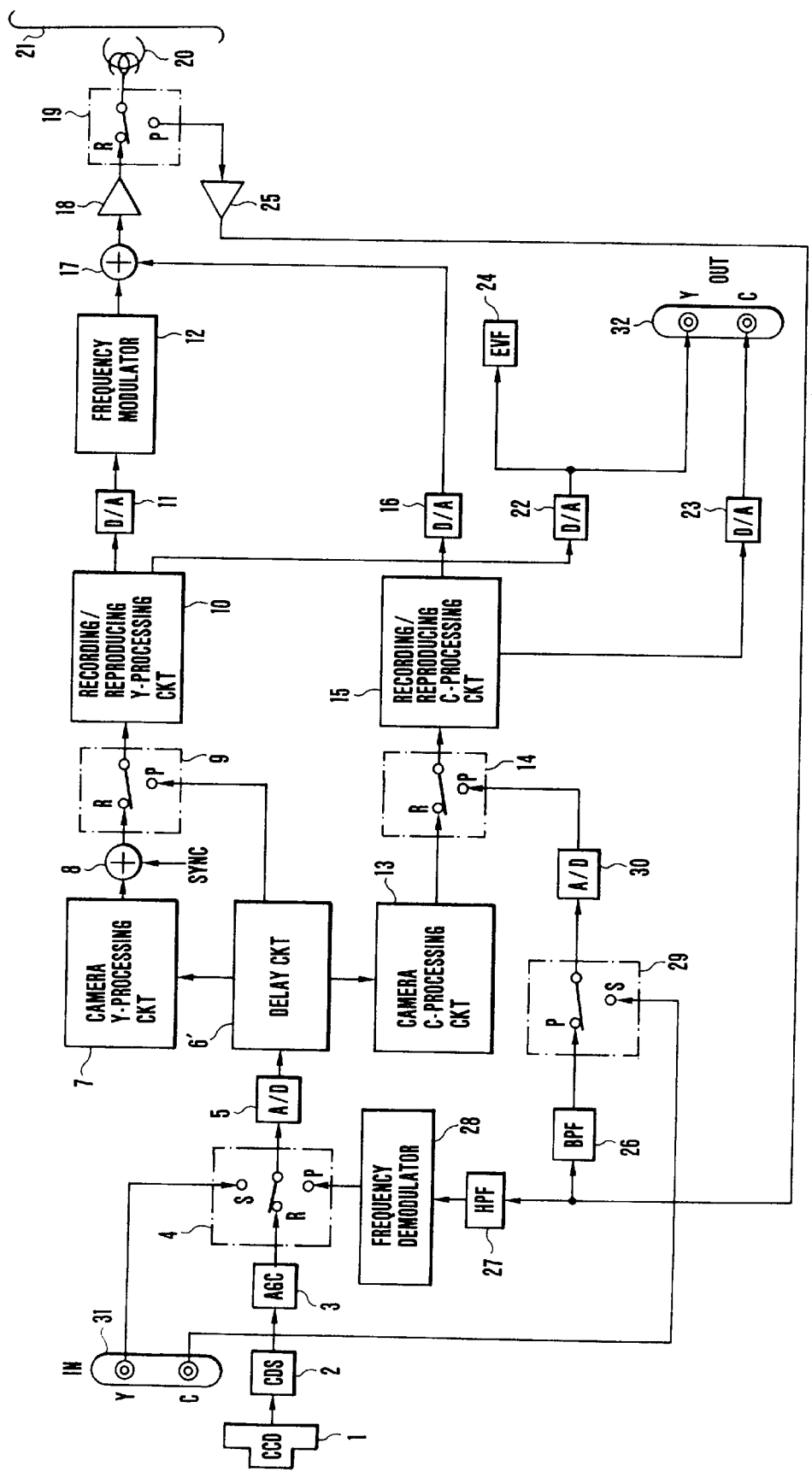
FIG. 4 is a block diagram showing a video camera arranged as a second embodiment of this invention.

A video camera which is arranged in accordance with this invention as a second embodiment thereof is described in detail below with reference to FIGS. 4 and 5:

FIG. 4 is a block diagram showing the video camera which is the second embodiment. FIG. 5 is a block diagram showing a delay circuit 6' which is included in the video camera shown in FIG. 4. In FIGS. 4 and 5, the same parts as those of FIGS. 2 and 3 are indicated by the same reference numerals and the details of them are omitted from the following description. In the case of the second embodiment, the video camera is arranged to process a luminance signal inputted from the external input terminal 31 by inputting it to the delay circuit 6'.

Figure 5:
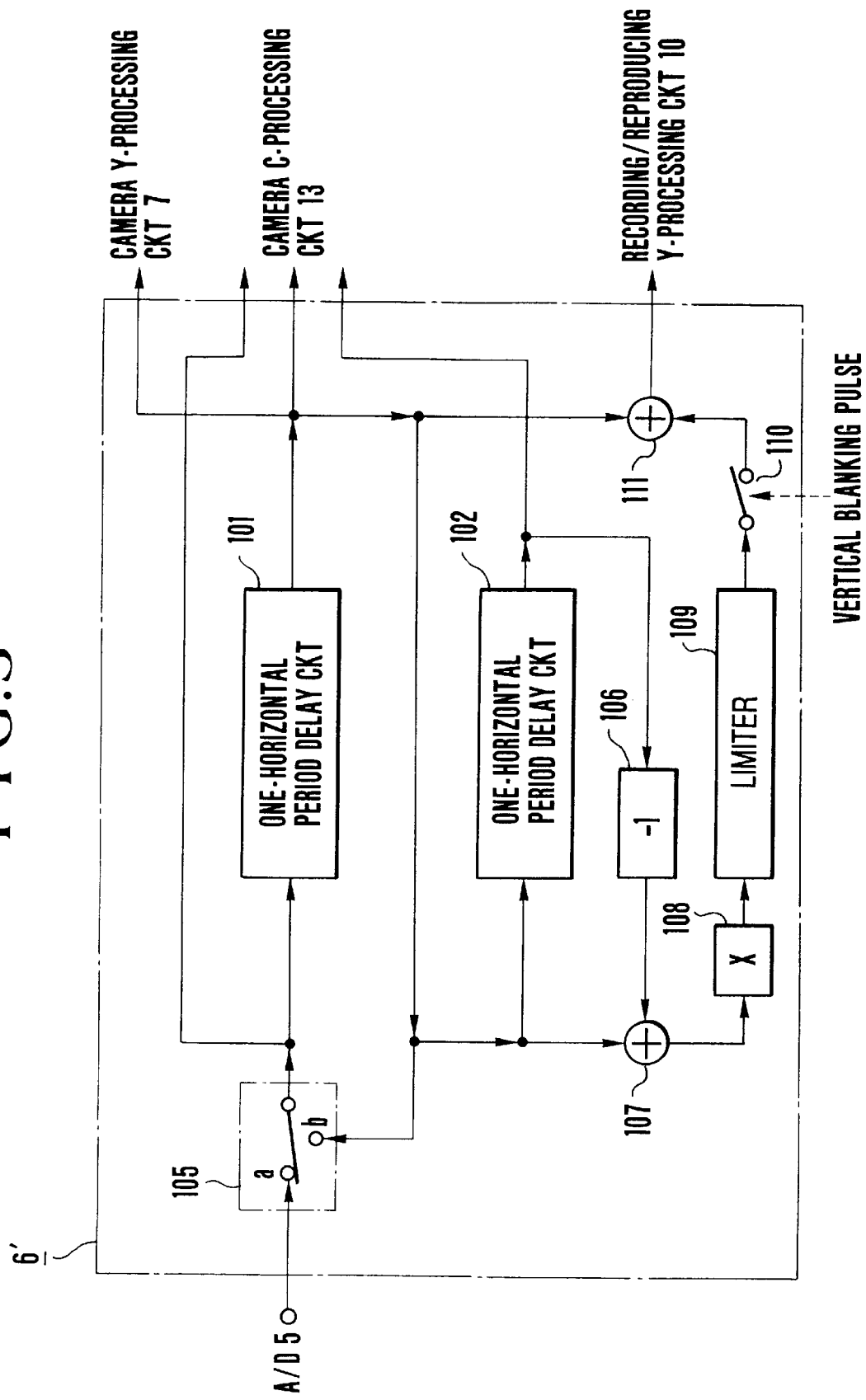
FIG. 5 is a block diagram showing the details of the essential parts of the video camera shown in FIG. 4.

In FIG. 5, the illustration includes the 1HDL circuits 101 and 102, a change-over switch 105 which is provided for dropout compensation, a −1 multiplier 106, adders 107 and 111, a multiplier 108, a limiter circuit 109, and a switch 110 which is controlled to be in an open state during a vertical blanking period and to be always in a closed state except during the vertical blanking period.

All the circuits and change-over switches forming the video camera are arranged to be controlled by a system control circuit which is not shown.

At the time of image pickup and recording, the video camera which is arranged as described above operates as described below:

A shooting object which is not shown is imaged on the image pickup plane of the CCD 1 by a photo-taking optical system which is not shown. The image is photo-electrically converted into an image signal. The image signal is supplied via the CDS 2, the AGC 3 and the change-over switch 4 (connected on one side R) to the A/D converter 5 to be converted into a digital signal. The digital signal is inputted to the delay circuit 6'.

Referring to FIG. 5, the signal inputted to the delay circuit 6' is sent to the 1HLD circuits 101 and 102 via the change-over switch 105 (connected to one side "a"). Signals thus delayed are inputted respectively to the camera Y-processing circuit 7 and the camera C-processing circuit 13. The camera Y-processing circuit 7 then forms a luminance signal from the input signal and performs gamma correction, white and black clipping and blanking signal adding processes on the luminance signal. Then, a sync signal is added to the luminance signal by the adder 8. The output of the adder 8 is inputted to the recording/reproducing Y-processing circuit 10 via the change-over switch 9 (connected to one side R). Then, the recording/reproducing Y-processing circuit 10 performs preemphasis and clipping processes required for recording.

The output of the recording/reproducing Y-processing circuit 10 is converted by the D/A converter 11 into an analog signal. The analog luminance signal thus obtained is frequency-modulated by the frequency modulator 12. The frequency-modulated luminance signal and a down-converted chrominance signal which will be described later are added together by the adder 17. The output of the adder 17 is supplied via the recording video amplifier 18 and the change-over switch 19 (connected to one side R) to the recording/reproducing head 20 to be recorded on the video tape 21.

Meanwhile, the camera C-processing circuit 13 forms two color-difference signals (R-Y and B-Y signals) from the signal inputted. The circuit 13 then performs processes for gamma correction, a color matrix, orthogonal modulation and burst addition required for forming a chrominance signal by modulating the two color-difference signals. After completion of these processes, the output of the circuit 13 is inputted via the change-over switch 14 (connected to one side R) to the recording/reproducing C-processing circuit 15. The circuit 15 then down-converts the frequency of the processed chrominance signal and performs preemphasis and color phase inversion processes which are necessary for recording. The output of the C-processing circuit 15 is converted into an analog signal by the D/A converter 16. The analog chrominance signal thus obtained and the frequency-modulated luminance signal are added together by the adder 17 as mentioned above.

In a case where an external input image is to be recorded and if the input image is inputted in a state of having its luminance and chrominance signals separated from each other, the embodiment operates to perform a recording action in a manner as described below:

The input signal from external equipment which is not shown is inputted to the S input terminal 31. A luminance signal included in the input signal is supplied via the change-over switch 4 (connected to one side S) to the A/D converter 5 to be converted into a digital signal. The digital luminance signal is inputted to the delay circuit 6'.

Referring to FIG. 5, in a case where occurrence of a dropout is detected by a dropout detection circuit which is not shown, the connecting position of the change-over switch 105 disposed within the delay circuit 6' is on one side "b" thereof to allow a signal portion obtained before the occurrence of the dropout to be outputted during the period of the dropout. The connecting position of the change-over switch 105 is on the other side "a" when no dropout takes place. The processes to be performed after that are carried out in the same manner both in the case of occurrence of dropout and in the case of nonoccurrence of dropout. With the 1HDL circuit 102 used, the edge parts in the vertical direction of the signal delayed by the 1HDL circuit 102 is emphasized by carrying out an arithmetic operation. The switch 110 is arranged to be in an open state during a vertical blanking period. A signal having its vertical edge parts emphasized is outputted from the adder 111.

This signal is inputted to the recording/reproducing Y-processing circuit 10 via the change-over switch 9 (connected to one side P).

Processes after the recording/reproducing Y-processing circuit 10 are carried out in the same manner as in the case of recording the image pickup signal.

Further, the chrominance signal included in the input signal is supplied via the change-over switch 29 (connected to one side S) to the A/D converter 30 to be converted into a digital signal. The digital signal thus obtained is inputted to the recording/reproducing C-processing circuit 15 via the change-over switch 14 (connected to one side P). Processes after the recording/reproducing C-processing circuit 15 are carried out in the same manner as the above-stated processes performed in recording the image pickup signal.

The operation of the embodiment for reproduction is performed in the following manner:

A signal recorded on the video tape 21 is read out by the recording/reproducing head 20. The output of the head 20 is supplied via the change-over switch 19 (connected to one side P) to the head amplifier 25 to be amplified to a given level. A down-converted chrominance signal is first taken out by the BPF 26 from the amplified signal. The chrominance signal is then supplied via the change-over switch 29 (connected to one side P) to the A/D converter 30 to be converted into a digital signal. The digital signal is inputted via the change-over switch 14 (connected to one side P) to the recording/reproducing C-processing circuit 15.

The recording/reproducing C-processing circuit 15 performs processes necessary for reproduction including a deemphasis process, a color phase inversion process and a frequency conversion process in a manner reverse to the processes performed at the time of recording. The signal outputted from the recording/reproducing C-processing circuit 15 is converted into an analog signal by the D/A converter 23. The analog signal is outputted to the outside from the S output terminal 32.

A frequency modulated luminance signal which is included in the output of the head amplifier 25 is taken out by the HPF 27. The luminance signal is demodulated by the frequency demodulator 28. The demodulated luminance signal is supplied via the change-over switch 4 (connected to one side P) to the A/D converter 5 to be converted into a digital signal. The digital luminance signal thus obtained is inputted to the delay circuit 6'.

In the delay circuit 6' (FIG. 5), the connecting position of the change-over switch 105 is on its side "b" in the event of detection of occurrence of a dropout by the dropout detection circuit which is not shown. With the switch 105 on the side "b", a signal portion obtained before the occurrence of the dropout is allowed to be outputted during the period of the dropout. The connecting position of the change-over switch 105 is on the other side "a" when no dropout takes place. Processes after that are carried out in the same manner irrespective of occurrence or nonoccurrence of dropout. With the 1HDL circuit 102 used, the edge parts in the vertical direction of the signal delayed by the 1HDL circuit 102 are arranged to be emphasized by carrying out an arithmetic operation. Further, the switch 110 is in an open state during a vertical blanking period.

The adder 111 outputs a signal with its vertical edge parts emphasized. The signal from the adder 111 is supplied via the change-over switch 9 (connected to one side P) to the recording/reproducing Y-processing circuit 10. The circuit 10 then performs a deemphasis process which is necessary at the time of reproduction. The output of the circuit 10 is converted into an analog signal by the D/A converter 22. The analog signal is outputted to the outside by the S output terminal 32. Further, the analog-converted luminance signal is outputted also to the EVF 24 for monitoring.

Figure 6:
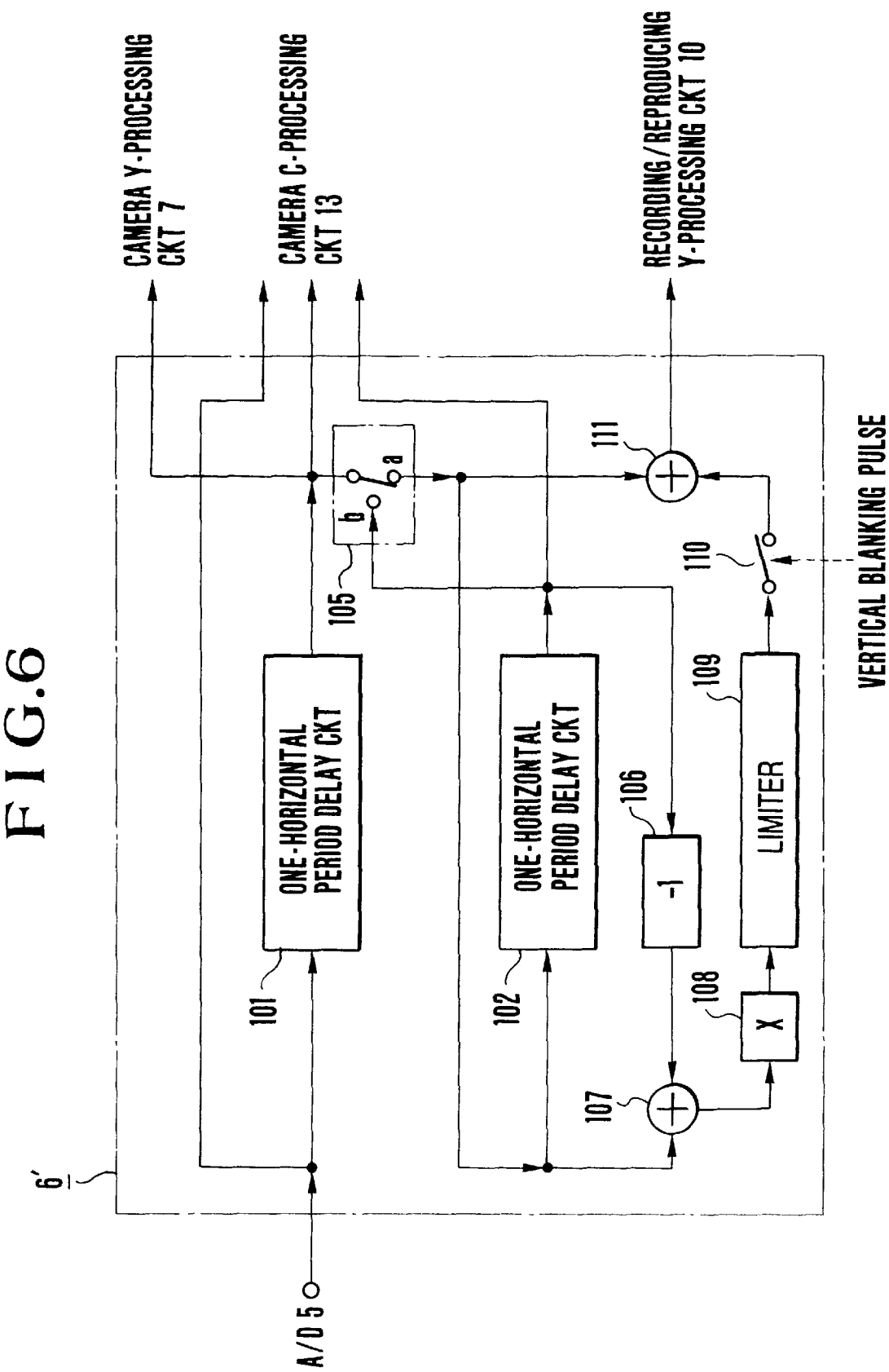
FIG. 6 is a block diagram showing the details of the essential parts of a video camera arranged according to this invention as a third embodiment thereof.

A video camera which is arranged also according to this invention as a third embodiment thereof is described in detail below with reference to FIG. 6:

FIG. 6 shows in a block diagram the arrangement of the delay circuit 6' which is included in FIG. 4. In FIG. 6, the same parts as those of FIG. 5 are indicated by the same reference numerals and the details of them are omitted from the following description.

The video camera of the third embodiment is arranged in the same manner as the video camera of FIG. 4 except that the circuit arrangement within the delay circuit 6' differs from that of the latter.

The delay circuit of the third embodiment is arranged as shown in FIG. 6. In the case of the third embodiment, dropout compensation and vertical enhancing actions are arranged to be carried out by utilizing only the 1HDL circuit 102 which is used at the time of camera shooting as a second H (horizontal period) delay line.

With the exception of this difference, the third embodiment performs the signal processing actions in the same manner as the second embodiment. Therefore, a further description of the third embodiment is omitted.

Figure 7:
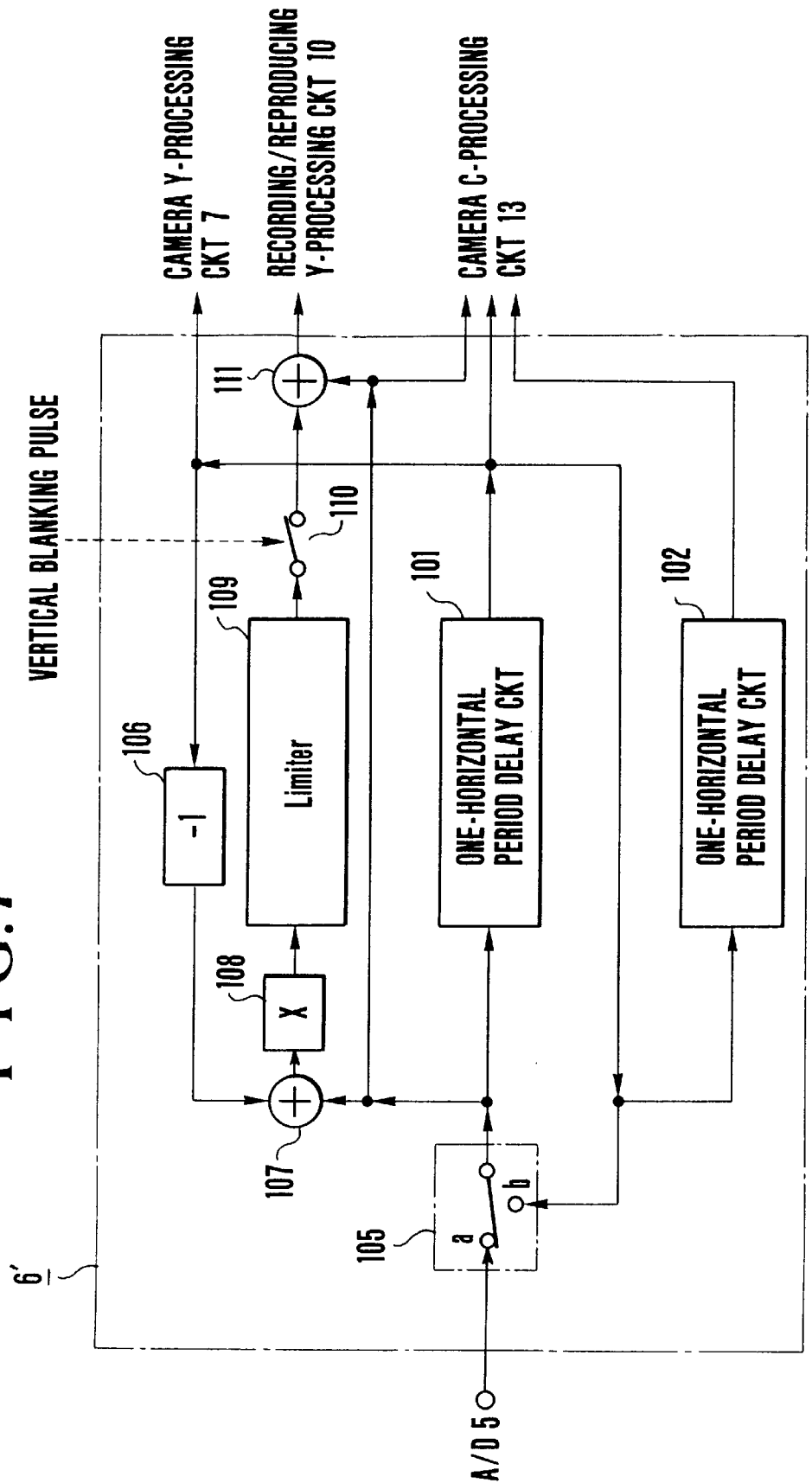
FIG. 7 is a block diagram showing the details of the essential parts of a video camera arranged according to this invention as a fourth embodiment thereof.

A video camera which is arranged as a fourth embodiment of this invention is described in detail below with reference to FIG. 7:

FIG. 7 shows in a block diagram the arrangement of the delay circuit 6' included in FIG. 4. In FIG. 7, the same parts as those of FIG. 5 are indicated by the same reference numerals and the details of them are omitted from the following description. The arrangement of the video camera of the fourth embodiment is the same as that of the video camera shown in FIG. 4 except the circuit arrangement within the delay circuit 6'.

The delay circuit is arranged as shown in FIG. 7. In the case of the fourth embodiment, the dropout compensation and vertical enhancing actions are arranged to be carried out by utilizing only the 1HDL circuit 101 which is used as a delay line for a first H (horizontal period) at the time of camera shooting. With the exception of this, the fourth embodiment-performs the signal processing actions in the same manner as those of the second embodiment described in the foregoing.

Figure 8:
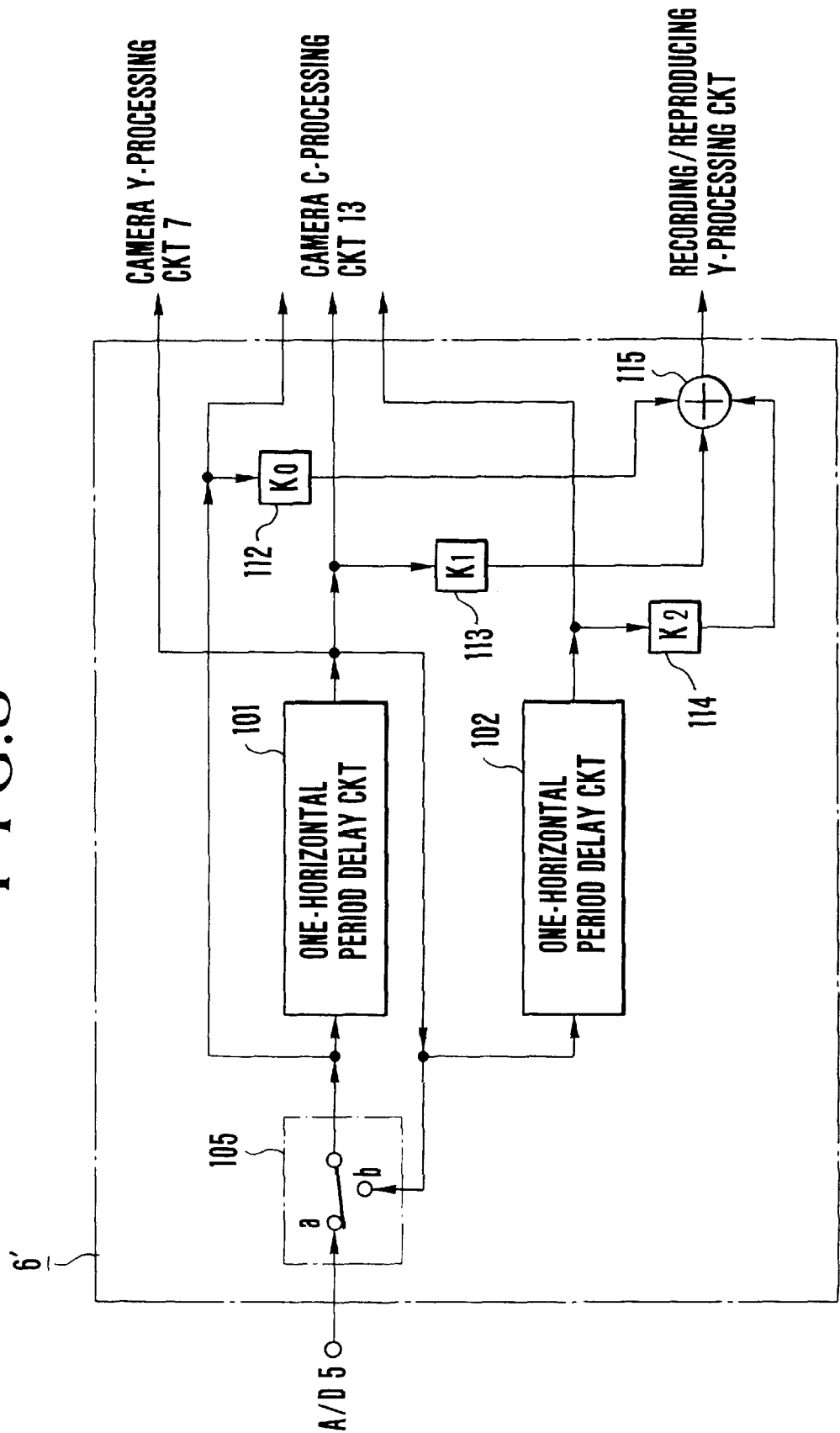
FIG. 8 is a block diagram showing the details of the essential parts of a video camera arranged according to this invention as a fifth embodiment thereof.

A video camera which is arranged according to this invention as a fifth embodiment thereof is described in detail below with reference to FIG. 8:

FIG. 8 shows in a block diagram the delay circuit 6' which is included in FIG. 4. In FIG. 8, the same parts as those shown in FIG. 5 are indicated by the same reference numerals and the details of them are omitted from the following description. The video camera of the fifth embodiment is arranged in the same manner as the video camera shown in FIG. 4 except that the circuit arrangement within the delay circuit 6' differs from the latter. In the case of the fifth embodiment, the delay circuit is arranged as shown in FIG. 8. The delay circuit 6' is provided with multipliers 112, 113 and 114 for improvement in the quality of image and an adder 115 which is arranged to add up the outputs of these multipliers.

More specifically, in the case of the fifth embodiment, the image quality is improved by carrying out the dropout compensation with a delay line for the first H (1HDL circuit 101) utilized and by carrying out the vertical enhancing action with a delay line for the second H (1HDL circuit 102) utilized. With the exception of this, the signal processing actions of the fifth embodiment are similar to those of the second embodiment and, therefore, require no further description.

Figure 9:
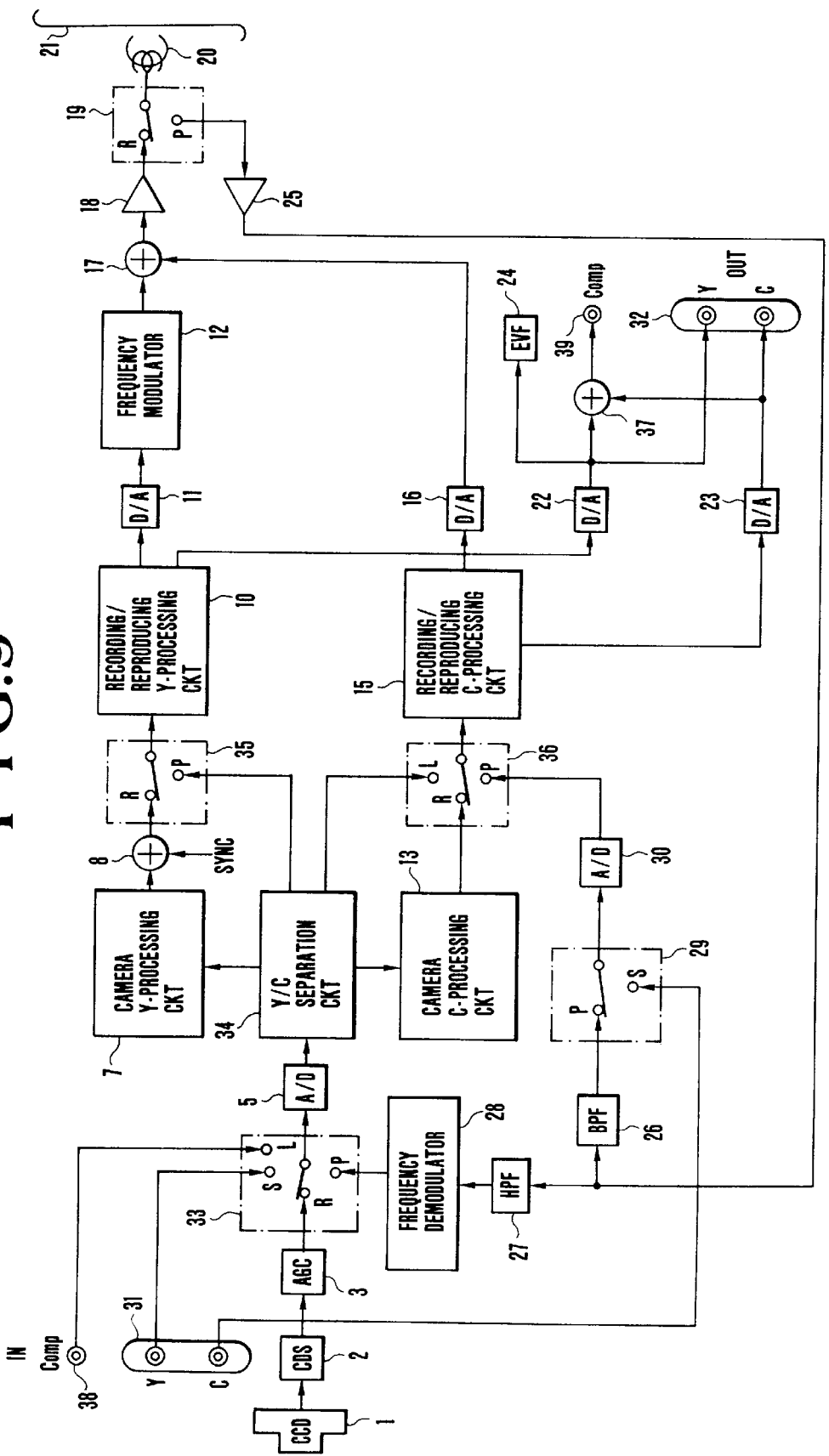
FIG. 9 is a block diagram showing a video camera arranged as a sixth embodiment of this invention.

A video camera which is arranged according to this invention as a sixth embodiment thereof is described in detail below with reference to FIGS. 9 and 10:

FIG. 9 shows in a block diagram the arrangement of the video camera. FIG. 10 shows in a block diagram a Y/C separation circuit 34 which is included in FIG. 9. In FIGS. 9 and 10 the same parts as those shown in FIGS. 4 and 5 are respectively indicated by the same reference numerals and their details are omitted from description.

Referring to FIG. 9, change-over switches 33, 35 and 36 are arranged to operate under the control of a system control circuit which is not shown in accordance with instructions given from a mode selection switch which is also not shown.

The Y/C separation circuit 34 includes two 1HDL circuits and is arranged to separate an external input video signal into a luminance signal and a chrominance signal for recording when the external input signal is a composite video signal. The illustration includes an adder 37, a composite video signal input terminal 38 (hereinafter referred to as video input terminal), and a composite video signal output terminal 39 (hereinafter referred to as video output terminal). All parts other than these parts are identical with those of the second embodiment described in the foregoing.

Figure 10:
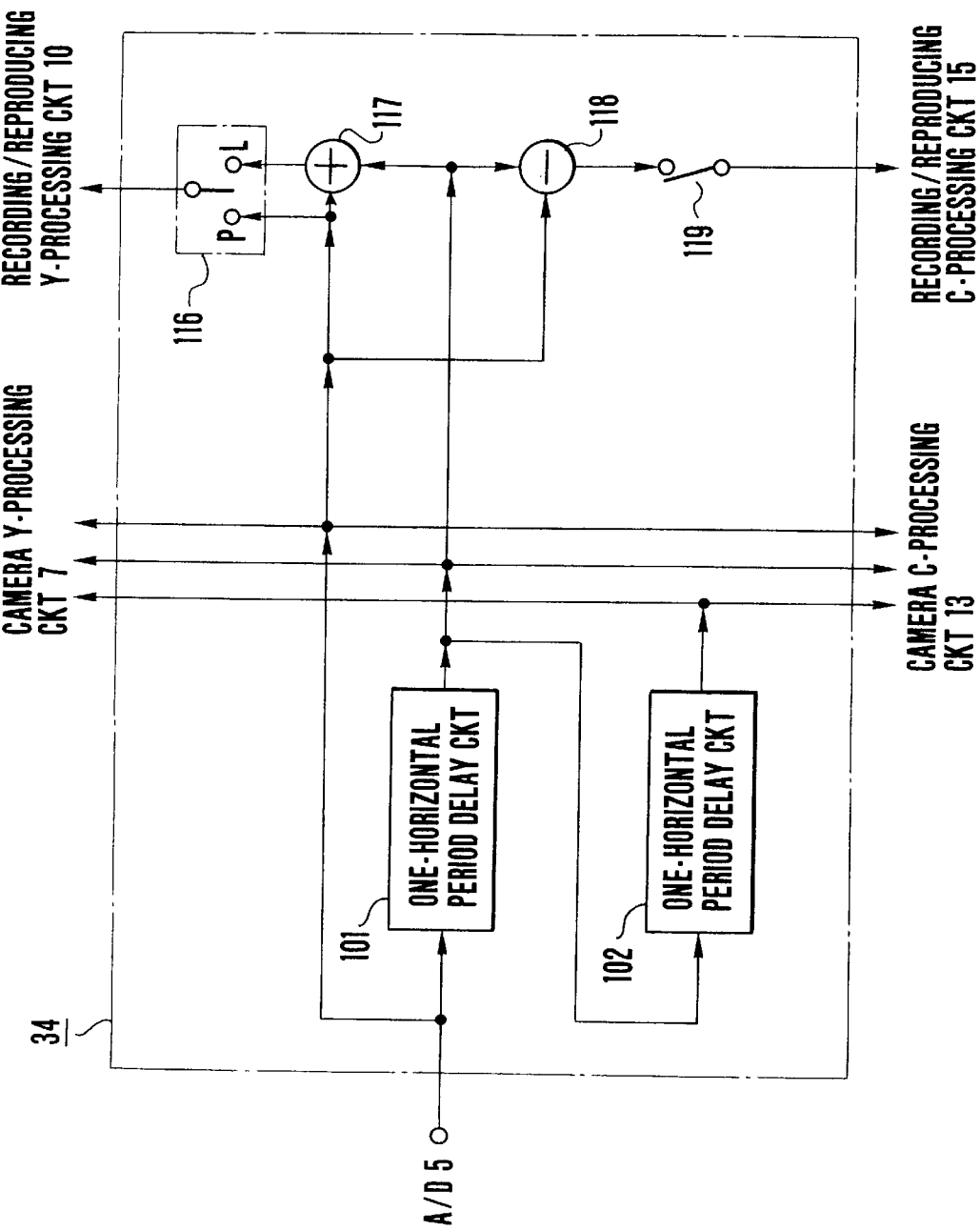
FIG. 10 is a block diagram showing the details of essential parts of the video camera shown in FIG. 9.

Referring to FIG. 10, the Y/C separation circuit 34 is provided with a change-over switch 116, an adder 117, a subtracter 118, and a switch 119. All the circuits and change-over switches forming the video camera are controlled by a system control circuit which is not shown.

At the time of image pickup and recording, the video camera which is arranged in the manner as described above operates as described below:

A shooting object which is not shown is imaged on the image forming plane of the CCD 1. The CCD 1 then photo-electrically converts the object image into an image signal. The image signal is supplied via the CDS 2, the AGC 3 and the change-over switch 33 (connected to one side R) to the A/D converter 5 to be converted into a digital signal. The digital signal thus obtained is inputted to the Y/C separation circuit 34.

Referring to FIG. 10, the signal inputted to the Y/C separation circuit 34 is sent to the 1HDL circuits 101 and 102 to be delayed. Then, the delayed signal outputs from these 1HDL circuits are inputted respectively to the camera Y-processing and C-processing circuits 7 and 13.

The camera Y-processing circuit 7 then forms a luminance signal from the input signal and performs the process for gamma correction, white and black clipping and blanking signal addition. The luminance signal is sent to the adder 8 to have a sync signal added to the luminance signal. The output of the adder 8 is inputted via the change-over switch 35 (connected to one side R) to the recording/reproducing Y-processing circuit 10.

The recording/reproducing Y-processing circuit 10 then performs preemphasis and clipping processes which are necessary for recording. The output of the circuit 10 is converted by the D/A converter 11 into an analog signal. The analog luminance signal thus obtained is frequency-modulated by the frequency modulator 12. At the adder 17, the frequency-modulated luminance signal and a down-converted chrominance signal which will be described later are added together. The output of the adder 17 is sent via the recording video amplifier 18 and the change-over switch 19 (connected to one side R) to the recording/reproducing head 20 to be recorded on the video tape 21 by the recording/reproducing head 20.

The output of the recording/reproducing Y-processing circuit 10 is sent also to the D/A converter 22 to be converted into an analog signal. The analog-converted luminance signal is sent to the EVF 24 to have the image pickup input displayed at the EVF 24. Further, since the analog-converted luminance signal is inputted also to the S output terminal 32, the luminance signal can be outputted to the outside.

Meanwhile, the camera C-processing circuit 13 forms two color-difference signals (R-Y and B-Y signals) from the input signal. The circuit 13 also performs processes for gamma correction, a color-difference matrix, orthogonal modulation and burst addition which are necessary in forming a chrominance signal by modulating the two color-difference signals. After completion of the signal processing action, the output of the circuit 13 is inputted to the recording/reproducing C-processing circuit 15 via the change-over switch 36 (connected to one side R). The recording/reproducing C-processing circuit 15 converts to a low band (down-converts) the frequency of the chrominance signal which has been processed in the above-stated manner. The circuit 15 also performs a preemphasis process and a color-phase inversion process which are necessary for recording.

The output of the recording/reproducing C-processing circuit 15 is converted into an analog signal by the D/A converter 16. The analog chrominance signal thus obtained is supplied to the adder 17. Then, as mentioned above, the adder 17 adds together the frequency-modulated luminance signal and the down-converted chrominance signal. Further, the output of the recording/reproducing C-processing circuit 15 is supplied also to the D/A converter 23 to be converted into an analog signal and the analog signal is outputted to the outside from the S output terminal 32.

In a case where an external input image is to be recorded, if luminance and chrominance signals are inputted in a state of being separated from each other, the recording action is performed as follows:

An input signal from external equipment which is not shown is inputted to the S input terminal 31. The luminance signal included in the input signal is sent via the change-over switch 33 (connected to one side S) to the A/D converter 5 to be converted into a digital signal. The digital signal thus obtained is inputted to the Y/C separation circuit 34. In this instance, in the Y/C separation circuit 34 (see FIG. 10), the connecting position of the change-over switch 116 is on one side P and the switch 119 is in an open state. Therefore, the luminance signal inputted to the Y/C separation circuit 34 is not processed by the circuit 34 and is inputted via the change-over switch 116 and another change-over switch 35 (connected to one side P) to the recording/reproducing Y-processing circuit 10. The processes to be performed at the circuit 10 and circuits operating subsequent thereto are similar to the processes performed in recording the image pickup signal as described in the foregoing.

Further, the chrominance signal included in the input signal is sent via the change-over switch 29 (connected to one side S) to the A/D converter 30 to be converted into a digital signal. The digital chrominance signal thus obtained is sent via the change-over switch 36 (connected on one side P) to the recording/reproducing C-processing circuit 15. The processes to be performed at the circuit 15 and subsequent circuits are similar to the processes performed in recording the image pickup signal as mentioned in the foregoing.

In recording external input images, if a video signal from an external equipment is a composite video signal, the recording action is performed as follows:

The composite video signal inputted from the external equipment to the video input terminal 38 comes via the change-over switch 33 (connected on one side L) to the A/D converter 5 to be converted into a digital signal. The digital signal is inputted to the Y/C separation circuit 34.

At that time, in the Y/C separation circuit 34 (see FIG. 10), the connecting position of the change-over switch 116 is on one side L thereof and the switch 119 is closed. The input composite video signal is first sent to the 1HDL circuit 101. The signal which is thus delayed by one horizontal period and the signal which is outputted from the A/D converter 5 are sent to the adder 117 and the subtracter 118 to have luminance and chrominance signals separated from each other. The luminance signal separated is sent to the recording/reproducing Y-processing circuit 10 via the change-over switch 116 (connected to one side L) and further via the change-over switch 35 (connected to one side P). Meanwhile, the chrominance signal which is separated by the Y/C separation circuit 34 is sent to the recording/reproducing C-processing circuit 15 via the switch 119 and further via the change-over switch 36 (connected to one side L).

The signal processing actions on the luminance signal inputted to the recording/reproducing Y-processing circuit 10 and on the chrominance signal inputted to the recording/reproducing C-processing circuit 15 are carried out in the same manner as the above-stated processes performed in recording the image pickup signal.

At the time of reproduction, the sixth embodiment operates as described below:

A signal recorded on the video tape 21 is read out by the recording/reproducing head 20. The output of the head 20 is sent via the change-over switch 19 (connected to one side P) to the head amplifier 25 to be amplified up to a given level. The signal thus amplified is first sent to the BPF 26 to take out a down-converted chrominance signal. The output of the BPF 26 is sent via the change-over switch 36 (connected to one side P) to the recording/reproducing C-processing circuit 15. At the circuit 15, processes necessary for reproduction, including a deemphasis process, a color-phase inversion process and a frequency conversion process are carried out in a manner reverse to the processes performed for recording. The output of the recording/reproducing C-processing circuit 15 is converted into an analog signal by the D/A converter 23. The analog signal is outputted to the outside from the S output terminal 32.

A frequency-modulated luminance signal which is included in the output of the head amplifier 25 is taken out by the HPF 27 and is demodulated by the frequency demodulator 28. The demodulated luminance signal is sent via the change-over switch 33 (connected to one side P) to the A/D converter 5 to be converted into a digital signal. The digital signal is inputted to the Y/C separation circuit 34. At that time, within the Y/C separation circuit 34 (see FIG. 10), the connecting position of the change-over switch 116 is on one side P and the switch 119 is open. Therefore, the luminance signal inputted is not processed within the circuit 34 and is sent via the change-over switch 116 and further via the change-over switch 35 (connected to one side P) to the recording/reproducing Y-processing circuit 10.

The recording/reproducing Y-processing circuit 10 then performs a deemphasis process which is necessary at the time of reproduction. The output of the circuit 10 is converted into an analog signal by the D/A converter 22. The analog luminance signal is outputted to the outside from the S output terminal 32.

Further, the luminance and chrominance signals which have been converted into analog signals as mentioned above are combined into a composite video signal by the adder 37. The composite video signal can be outputted to the outside from the video output terminal 39.

Further, the luminance signal as converted into an analog signal is inputted also to the EVF 24, so that the signal can be used for monitoring.

Figure 11:
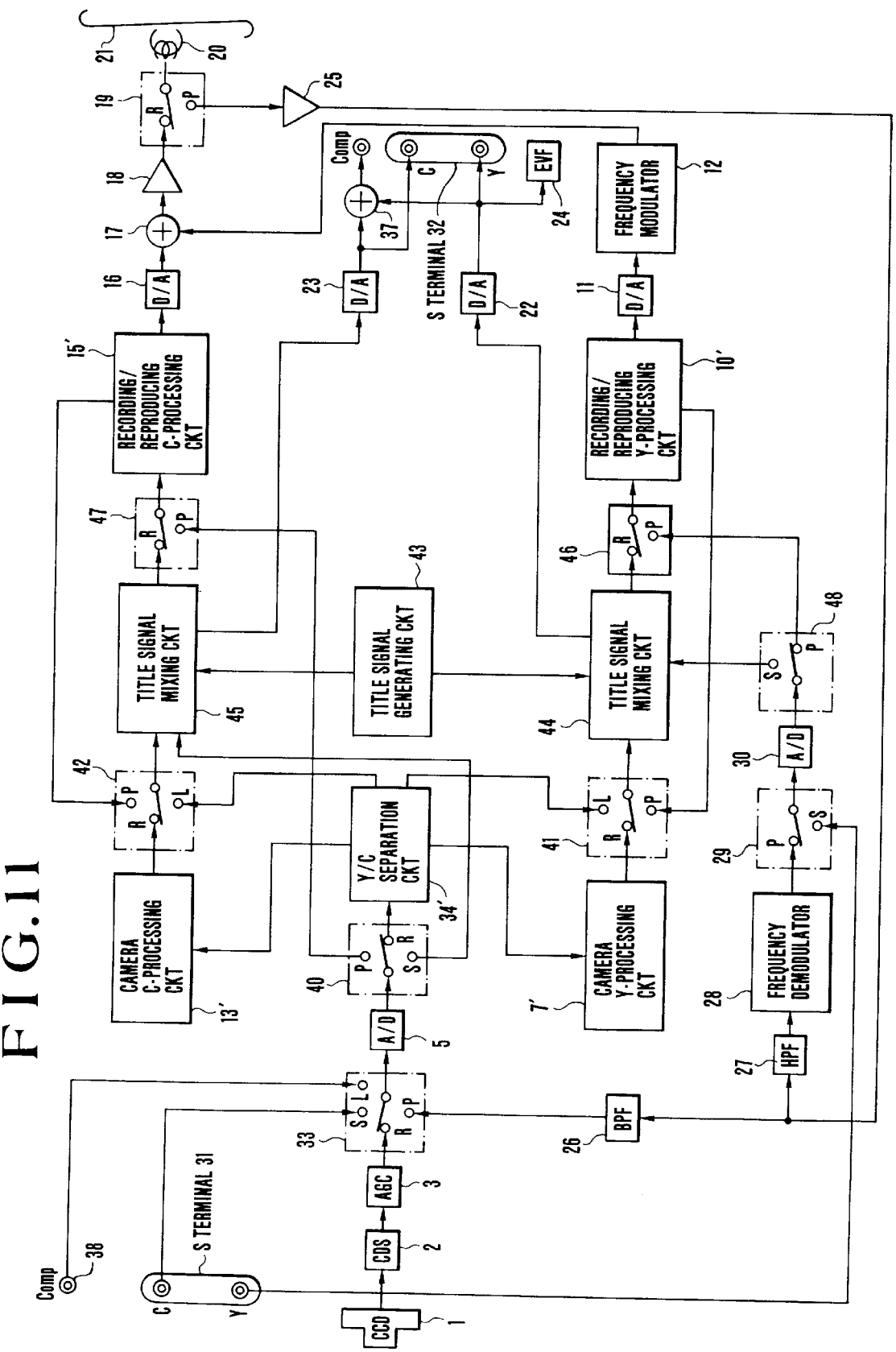
FIG. 11 is a block diagram showing a video camera arranged as a seventh embodiment of this invention.

A video camera which is arranged as a seventh embodiment of this invention is described in detail below with reference to FIGS. 11 and 12:

FIG. 11 is a block diagram showing the video camera arranged as the seventh embodiment of this invention. FIG. 12 is a block diagram showing a Y/C separation circuit which is shown in FIG. 11. In FIGS. 11 and 12, the same parts as those shown in FIGS. 9 and 10 respectively are indicated by the same reference numerals and their details are omitted from description.

Referring to FIG. 11, in the case of the seventh embodiment, the video camera is provided with change-over switches 40, 41, 42, 46, 47 and 48 for switching actions under the control of a system control circuit which is not shown in accordance with instructions given from a mode selection switch which is also not shown, a title signal generating circuit 43 which is arranged to generate a predetermined color title signal in accordance with an instruction given from the system control circuit, and title signal mixing circuits 44 and 45 which are arranged to mix title signals respectively with recording and reproduced signals. A camera Y-processing circuit 7', a camera C-processing circuit 13', a recording/reproducing Y-processing circuit 10', a recording/reproducing C-processing circuit 15' and a Y/C separation circuit 34' are arranged to perform processing actions differently from the processing actions performed by the corresponding circuits shown in FIG. 9, respectively.

Figure 12:
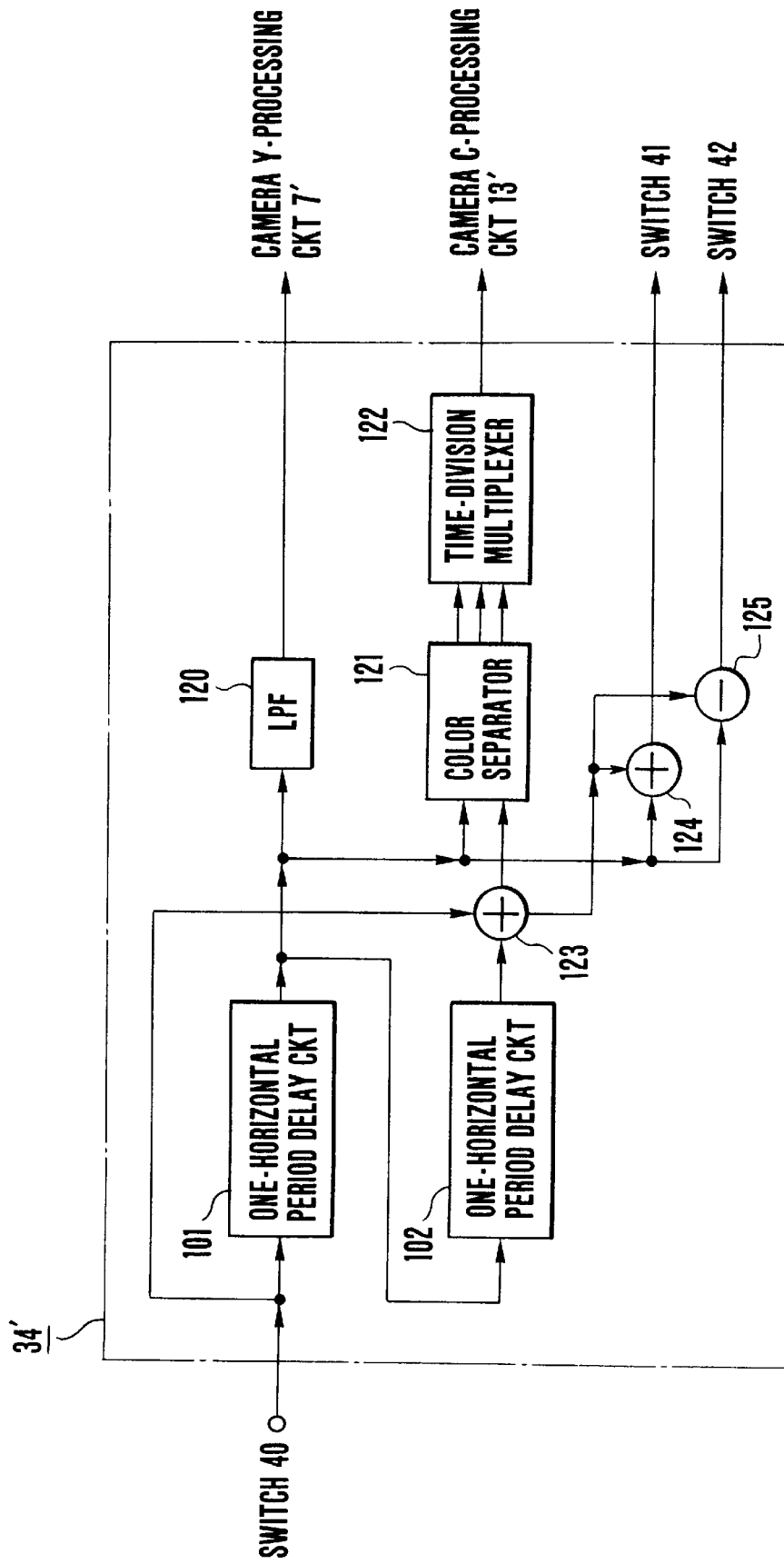
FIG. 12 is a block diagram showing the details of essential parts of the video camera shown in FIG. 11.

Referring to FIG. 12, the Y/C separation circuit 34' includes a low-pass filter (hereinafter referred to as LPF) 120 which is arranged to pass only a luminance signal included in an image pickup signal, a color separator 121 which has a synchronous detector and a matrix circuit and which is arranged to form primary color signals R, G and B from the image pickup signal, a time-division multiplexer 122 which is arranged to time-divisionally multiplex the R, G and B signals, adders 123 and 124, and a subtracter 125. Further, all circuits, change-over switches, etc., that form the video camera are controlled by the system control circuit which is not shown.

In performing an image pickup and recording action, the video camera which is arranged as described above operates as described below:

A shooting object which is not shown is imaged on the image forming plane of the CCD 1 by a photo-taking optical system which is not shown. The object image thus obtained is photo-electrically converted into an image signal by the CCD 1. The image signal is sent via the CDS 2, the AGC 3 and the change-over switch 33 (connected to one side R) to the A/D converter 5 to be converted into a digital signal. The digital signal is inputted to the Y/C separation circuit 34' via the change-over switch 40 (connected on one side R).

Referring to FIG. 12, the image pickup signal inputted is delayed one horizontal period by the 1HDL circuit 101. After that, in the delayed signal, only a luminance signal is allowed to pass through the LPF 120. The luminance signal is sent to the camera Y-processing circuit 7'. The output of the 1HDL circuit 101 is further delayed by the 1HDL circuit 102 to be thus delayed two horizontal periods. The two-horizontal-period-delayed signal and the signal which is not delayed are added together by the adder 123. The output of the adder 123 is inputted to the color separator 121 along with the output of the 1HDL circuit 101. At the color separator 121, a plurality of color signals are detected from the two input signals by synchronous detection. The color separator 121 further performs a matrix process to obtain primary color signals R, G and B.

The primary color signals R, G and B are time-divisionally multiplexed by the time-division multiplexer 122 and is sent to the camera C-processing circuit 13' as a chrominance signal.

The luminance signal which is outputted from the Y/C separation circuit 34' is sent to the recording/reproducing Y-processing circuit 7' to be subjected to the processes including gamma correction, white and black clipping, blanking signal addition and sync signal addition. The luminance signal thus processed is sent via the change-over switch 41 (connected to one side R) to the title signal mixing circuit 44 to be mixed with a title luminance signal which is generated by the title signal generating circuit 43. The output of the title signal mixing circuit 44 is inputted to the recording/reproducing Y-processing circuit 10' via the change-over switch 46 (connected to one side R). At this time, the recording/reproducing Y-processing circuit 10' performs preemphasis and clipping processes which are necessary for recording. The output of the circuit 10 is converted into an analog signal by the D/A converter 11. The analog luminance signal is frequency-modulated by the frequency modulator 12. The frequency-modulated luminance signal and a down-converted chrominance signal which will be described later are added together by the adder 17. The output of the adder 17 is sent via the recording amplifier 18 and the change-over switch 19 (connected to one side R) to the recording/reproducing head 20 to be recorded on the video tape 21.

The chrominance signal outputted from the Y/C separation circuit 34' is sent to the camera C-processing circuit 13'. The circuit 13' then performs processes for gamma correction, a color-difference matrix, orthogonal modulation and burst addition. The chrominance signal thus processed is sent via the change-over switch 42 (connected to one side R) to the title signal mixing circuit 45 to be mixed with a title color signal generated by the title signal generating circuit 43. The mixed signal is modulated with a color subcarrier. The signal thus modulated is inputted via the change-over switch 47 (connected to one side R) to the recording/reproducing C-processing circuit 15'. The circuit 15' then performs preemphasis and color-phase inversion processes which are necessary for recording. The output of the circuit 15' is converted into an analog signal by the D/A converter 16. The analog chrominance signal thus obtained and the frequency-modulated luminance signal are added together by the adder 17 as mentioned in the foregoing.

The outputs of the title signal mixing circuits 44 and 45 are inputted also to the D/A converters 22 and 23 to be converted into analog signals, respectively. The luminance signal and the chrominance signal are combined with each other and outputted to the video output terminal 39 while the luminance signal and the chrominance signal are outputted to the S output terminal 32 in a separated state. Therefore, the images carried by these signals can be monitored by connecting external equipment such as a TV set to these output terminals.

Further, the luminance signal which is converted into an analog signal by the D/A converter 22 is inputted also to the EVF 24, so that images can be monitored by the operator of the apparatus.

In recording an external input image, if luminance and chrominance signals are inputted in a state of being separated from each other, a recording action is performed as described below:

An input signal from external equipment which is not shown is received at the S input terminal 31. The luminance signal of the input comes via the change-over switch 29 (connected to one side S) to the A/D converter 30 to be converted into a digital signal. The digital signal is inputted via the change-over switch 48 (connected to one side S) to the title signal mixing circuit 44. Processes to be performed by the circuit 44 and subsequent circuits are similar to the processes which are performed in recording the image pickup signal as described in the foregoing.

Meanwhile, the chrominance signal inputted to the S input terminal 31 comes via the change-over switch 33 (connected to one side S) to the A/D converter 5 to be converted into a digital signal. The digital signal is sent via the change-over switch 40 (connected to one side S) to the title signal mixing circuit 45. Processes to be performed by the circuit 45 and subsequent circuits are similar to the above-stated processes performed in recording the image pickup signal.

In recording an external input image, if the input is a composite video signal, a recording action is performed as described below:

The input composite video signal from an external equipment which is not shown is received at the video input terminal 38. The input video signal comes via the change-over switch 33 (connected to one side L) to the A/D converter 5 to be converted into a digital signal. The digital signal is inputted via the change-over switch 40 (connected to one side R) to the Y/C separation circuit 34'. The composite video signal inputted to the Y/C separation circuit 34' comes to the 1HDL circuits 101 and 102. A signal which is delayed by the 1HDL circuit 101, a signal which is obtained through the adder 123 by adding together a signal delayed by both the 1HDL circuits 101 and 102 and a signal which is not delayed are added together by the adder 124. Through this process, the chrominance component is removed from the input signal and the input signal is sent to the change-over switch 41 as a luminance signal.

Further, a chrominance signal is obtained by removing the luminance signal component from the input signal through a subtracting operation performed on these signals at the subtracter 125. The chrominance signal thus obtained is sent to the change-over switch 42.

The luminance signal outputted from the Y/C separation circuit 34' is inputted via the change-over switch 41

(connected to one side L) to the title signal mixing circuit 44. Processes to be performed by this circuit 44 and circuits operating subsequent thereto are similar to the processes performed in recording the image pickup signal as described in the foregoing.

The chrominance signal also outputted from the Y/C separation circuit 34' is inputted via the change-over switch 42 (connected to one side L) to the title signal mixing circuit 45. Processes to be performed by the circuit 45 and subsequent circuits are similar to the processes performed in recording the image pickup signal as described in the foregoing.

Next, the operation of the embodiment to be performed for reproduction is described as follows:

A signal recorded on the video tape 21 is read out by the recording/reproducing head 20. The output (reproduced signal) of the head 20 is sent via the change-over switch 19 (connected to one side P) to the head amplifier 25 to be amplified up to a given level. The amplified reproduced signal is sent to the BPF 26 to have a down-converted chrominance signal separated from the reproduced signal. The chrominance signal thus separated comes via the change-over switch 33 (connected to one side P) to the A/D converter 5 to be converted into a digital signal. The digital signal is inputted via the change-over switch 40 (connected to one side P) and further the change-over switch 47 (connected to one side P) to the recording/reproducing C-processing circuit 15'.

The recording/reproducing C-processing circuit 15' performs processes necessary at the time of reproduction including a deemphasis process, a color-phase inversion process and a frequency modulation process. The output of the recording/reproducing C-processing circuit 15' comes via the change-over switch 42 (connected to one side P) to the title signal mixing circuit 45 to be mixed with a title signal and to be modulated with a color subcarrier. The output of the mixing circuit 45 is converted into an analog signal by the D/A converter 23. The analog-converted chrominance signal is outputted to the outside from the S output terminal 32.

A frequency-modulated luminance signal included in the output of the head amplifier 25 is separated from the amplified reproduced signal by the HPF 27. The luminance signal is demodulated by the frequency demodulator 28 and then comes via the change-over switch 29 (connected to one side P) to the A/D converter 30 to be converted into a digital signal. The digital signal is inputted via the change-over switch 48 (connected to one side P) and further via the change-over switch 46 (connected to one side P) to the recording/reproducing Y-processing circuit 10'. The recording/reproducing Y-processing circuit 10' performs a deemphasis process which is necessary at the time of reproduction.

The output of the recording/reproducing Y-processing circuit 10' comes via the change-over switch 41 (connected to one side P) to the title signal mixing circuit 44 to have a title signal mixed with the luminance signal. The output of the title signal mixing circuit 44 is converted into an analog signal by the D/A converter 22. The analog-converted luminance signal is outputted to the outside from the S output terminal 32.

The analog-converted luminance signal is also supplied to the adder 37 to be combined with the chrominance signal into a composite video signal. The composite video signal is also outputted from the video output terminal 39. Further, the luminance signal which is analog-converted by the D/A converter 22 is outputted also to the EVF 24 for monitoring.

In the case of the video signal processing apparatus arranged as the seventh embodiment of this invention as described above, the same A/D converter is used as the A/D converter which digital-converts the image signal outputted from image pickup means, as the A/D converter which digital-converts a video signal inputted through an external input terminal and also as the A/D converter which digital-converts a reproduced video signal at the time of reproduction. Further, the delay circuit included in the composing means arranged to form a color video signal by using the signal outputted from the image pickup means is arranged to be utilized also for separating from each other the luminance and chrominance signal components of a video signal which is inputted from the external input terminal. The number of necessary component parts, therefore, can be reduced to permit a reduction in the scale of circuit arrangement and, hence, a reduction in manufacturing cost.

While the invention has been described in its preferred embodiments, it will be obvious to those skilled in the art that various changes and modifications may be made without departing from the true spirit and essential features of the invention. In other words, the foregoing description of embodiments has been given for illustrative purpose only and not to be construed as imposing any limitation in every respect.

The scope of the invention is, therefore, to be determined solely by the following claims and not limited by the text of the specification, and alterations made within a scope equivalent to the scope of the claims fall within the true spirit and scope of the invention.

What is claimed is:

1. A video signal processing apparatus for digitally processing a video signal comprising:
   a) image pickup means arranged to photoelectrically convert an optically formed object image and to output the object image as an electrical signal;
   b) first input means for receiving a composite video signal, the composite video signal being generated from an external apparatus;
   c) second input means for receiving a separation type video signal in which a luminance signal and a color signal are separated, the separation type video signal being generated from the external apparatus;
   d) first digital conversion means for effecting a digital converting action selectively on the electrical signal, on either one of the luminance signal and the color signal of the separated video signal and on the composite video signal before separation of the luminance signal and the color signal;
   e) second digital conversion means for effecting a digital converting action on the other signal of the separated video signal; and
   f) signal processing means having a plurality of delay circuits, said signal processing means having a function of forming a color video signal from the electrical signal output from said image pickup means by using said plurality of delay circuits and a function of separating the composite video signal input from said external apparatus into the luminance signal and the color signal by using the plurality of delay circuits.

2. An apparatus according to claim 1, further comprising recording means for recording on a recording medium a video signal processed by said signal processing means.

3. An apparatus according to claim 2, further comprising reproducing means for reproducing a video signal recorded on the recording medium.

4. An apparatus according to claim 3, wherein said signal processing means is arranged to utilize said plurality of delay circuits for compensating processing of dropout of the reproduced image signal of the image signal.

5. An apparatus according to claim 3, wherein said first digital conversion means is arranged to perform a digital converting action on the reproduced video signal during reproduction.

6. An apparatus according to claim 3, wherein a cross talk component of the video signal reproduced by said reproducing means is removed by using said plurality of delay circuits.

7. An apparatus according to claim 3, wherein the video signal reproduced by said reproducing means is subjected to a vertical enhancing process by using said plurality of delay circuits.

\* \* \* \* \*